United States Patent [19]

Dodd

[11] 4,397,159
[45] Aug. 9, 1983

[54] APPARATUS FOR CHILLING A PLURALITY OF FOOD TRAYS

[75] Inventor: Malcolm J. Dodd, Litchfield, Conn.

[73] Assignee: UOP Inc., Des Plaines, Ill.

[21] Appl. No.: 321,852

[22] Filed: Nov. 16, 1981

[51] Int. Cl.³ ............................................. F25D 25/02
[52] U.S. Cl. .................................... 62/382; 62/388;
62/455; 165/48 R; 165/DIG. 26; 312/236
[58] Field of Search ................ 62/382, 384, 387, 388,
62/440, 448, 454, 455; 165/48 R, DIG. 25,
DIG. 26; 312/214, 236

[56] References Cited

U.S. PATENT DOCUMENTS

| Re. 30,623 | 5/1981 | Schulz et al. | 165/48 R |
|---|---|---|---|
| 3,517,899 | 6/1970 | Vernon | 244/118 |
| 3,866,435 | 2/1975 | Frank et al. | 62/388 |
| 3,866,436 | 2/1975 | Frank et al. | 62/388 |
| 3,976,122 | 8/1976 | Neidhardt | 165/48 R |
| 4,005,745 | 2/1977 | Colato et al. | 165/2 |
| 4,103,736 | 8/1978 | Colato et al. | 165/48 R |
| 4,346,756 | 8/1982 | Dodd et al. | 165/48 R |

*Primary Examiner*—Ronald C. Capossela
*Attorney, Agent, or Firm*—James R. Hoatson, Jr.; Barry L. Clark; William H. Page, II

[57] ABSTRACT

Chilling apparatus especially adapted for airline food tray serving carts has a small blower at one upper end of the inside of the cart which exhausts air across a pan of dry ice or other cooling material removably positioned on an upper shelf of the cart. Spacer means in the cart enclosure prevent the trays stacked therein from blocking a vertical air flow passage at each end of the cart. Thus, the chilled air is directed downwardly from the pan over the inside wall of a door on the cart. The chilled air then passes horizontally over at least a portion of the trays containing items to be chilled and is sucked upwardly along the other inside end wall of the cart to the blower inlet duct. The apparatus is very light in weight and can provide sufficiently uniform cooling to the items on each tray which must be chilled when a container on each tray is being simultaneously heated.

6 Claims, 5 Drawing Figures

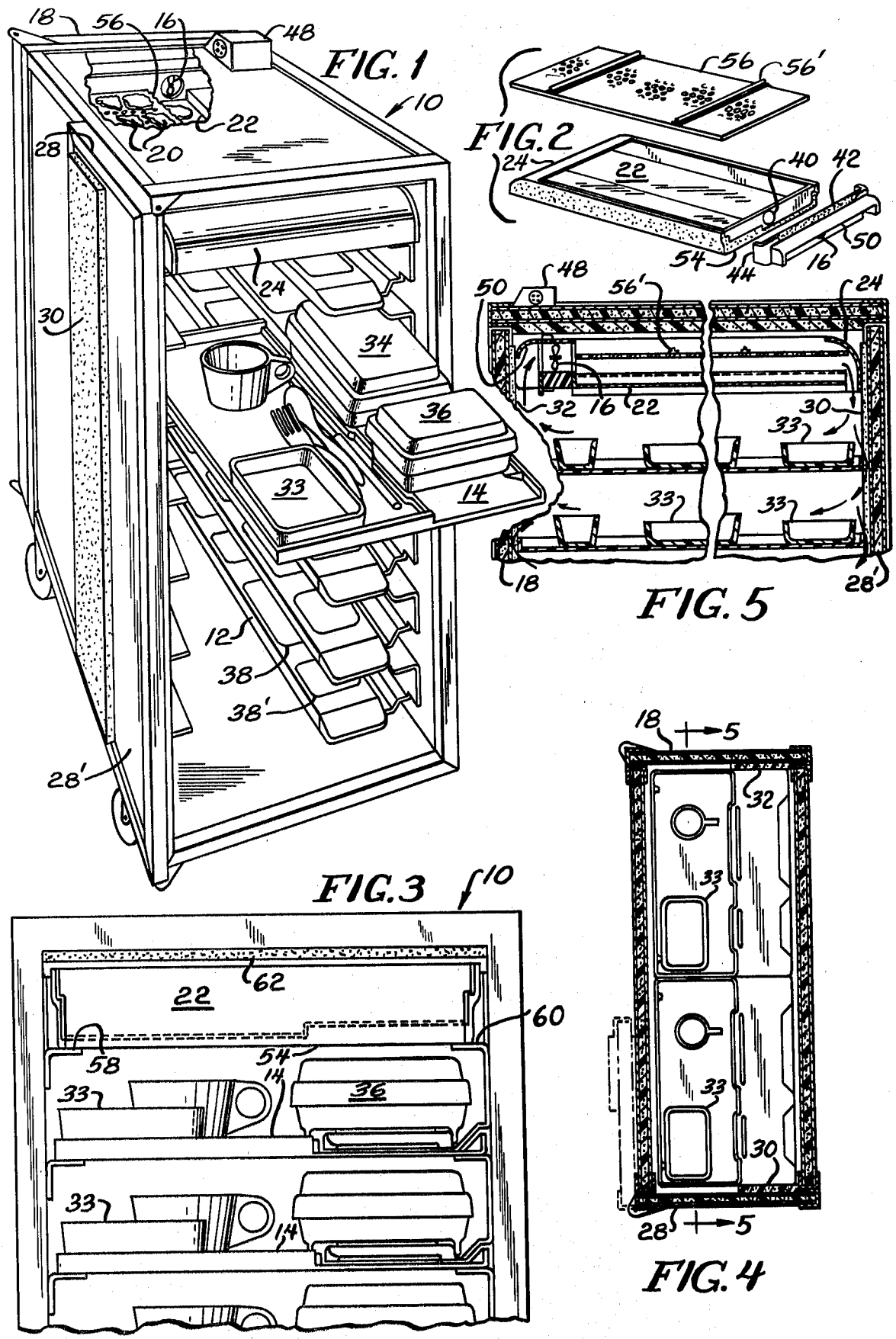

APPARATUS FOR CHILLING A PLURALITY OF FOOD TRAYS

BACKGROUND OF THE INVENTION

The invention relates to food tray-containing carts of the general type used by airlines and hospitals to hold food until it is ready to be served. More particularly, the invention relates to the mechanism by which the food trays are kept in a chilled condition from the time they leave the place of preparation until they are removed from the cart. The majority of known cart systems for holding trays use one cart or a portion thereof for holding trays in a chilled atmosphere and another for holding the containers for the hot portion of the meal. The hot meal containers are commonly fully cooked and then merely kept warm in the cart, or else they are partially cooked and kept warm and then brought up to a high temperature before serving. Such systems necessitate the use of a significant amount of labor and space to assemble the hot items to the tray containing the cold items. Furthermore, in the case of a hospital where different patients require different diets, such a system presents a problem of getting the wrong hot item on a patient's tray. Other systems merely insulate the trays so that with the passage of any significant amount of time, the hot food will cool and the cold food will get warm. In order to overcome the aforementioned problems and to greatly improve the palatability of the hot food, there have been a number of systems proposed for keeping all of the food on a tray chilled in a refrigerated atmosphere and then selectively heating the bottom surfaces of the hot items just before serving. Insulating covers on the hot containers help to prevent a loss of heat from the food therein. One such system, which has apertures in the tray bottom through which the hot dishes project into contact with a heater element, is disclosed in Colato et al U.S. Pat. No. 4,005,745. This system includes an enclosure which may contain dry ice and a blower positioned on top of a cart and having short inlet and exhaust conduits extending downwardly through the top wall of the cart to carry chilled air to and from the interior of the cart. Other systems in which the hot containers do not project through the tray bottom are shown in Schulz et al, Reissue Patent No. Re. 30,623 and in Dodd et al, U.S. Pat. No. 4,346,756. In these systems which are especially suited for use in aircraft, a heater shelf carried by the cart is slid under a restrained hot dish as the tray is assembled to the cart. Cooling is shown as being provided through apertures in an end of the cart which are placed in communication with external refrigeration equipment. However, it is broadly noted that other cooling means, including dry ice, could be used as an external source of cooling air, or could be placed in a cart. The latter patent and copending application are assigned to the same assignee as the present application and their disclosures are incorporated by reference herein.

With weight and space both being extremely critical in an aircraft, it is desirable to eliminate the need for separate storage facilities for hot foods as is possible with the cart systems shown in the aforementioned Reissue Patent and Application. However, where chilling is provided by mechanical refrigeration equipment mounted in the aircraft, it is usual to provide a separate, relatively heavy unit for each set of four or five carts which the aircraft can accommodate. These units are not only relatively expensive, but they are quite heavy and each of them must be flown and powered on every flight, even though there are few full tray carts on the aircraft on many of its flights. The mere placement of dry ice within the cart has been found to be insufficient to provide uniform chilling of the closely stacked trays and to overcome the heat loss from the heated containers. The latter loss is not great as the previously chilled containers are heated to serving temperature, but obviously all of the heat produced during any "hold warm" operation made after the containers are brought to serving temperature must be overcome by the chilling medium if the chilled foods are to be maintained at a desired safe storage temperature. A top mounted dry ice cooling unit of the type shown in U.S. Pat. No. 4,005,745 would appear to cause a considerable loss of cart storage area since the cart would have to be much lower to fit in its usual undercounter storage location in an aircraft galley. Also, the inlet and outlet flow conduits which are depicted would appear to be incapable of providing sufficient uniform cooling of all of the trays in an elongated, narrow width aircraft tray cart.

SUMMARY OF THE INVENTION

It is an object of the present invention to provide an improved chilling apparatus for a food tray storage cart, and especially for an aircraft food service cart which is long and narrow so as to be readily movable through the aisles of an aircraft, and which has a door at at least one end and preferably at both ends. It is a further object to provide a chilling system which is very light in weight and compact, and yet quite capable of providing satisfactory chilling of a large number of closely stacked trays for substantial periods of time, even when certain items on the trays are being heated, and even when delays in serving take place.

These and other objects are achieved by the apparatus of the present invention which is generally described in the accompanying Abstract. The chilling apparatus easily fits within the space of one shelf in a cart of the type disclosed in the aforementioned Application. The blower and its curved mounting and inlet guide plate are preferably affixed to the inside of the cart. The elongated pan into which dry ice or other cooling material is adapted to be placed is slid like a drawer onto the top shelf of the cart. Since the cooling material is preferably dry ice which merely changes from the solid to the gaseous phase, or a sealed container of a chemical which provides greater cooling capacity than ordinary ice, its ends can be open. Thus, one end has one or more apertures to mate with the exhaust structure of one or more small diameter fans or blowers, while the other end preferably terminates in a curved surface which directs the chilled air and $CO_2$ vapor downwardly. Where dry ice is used, it is preferable to use several thin layers of broken-up pieces, with the layers being separated by thin perforated horizontal spacer plates to maximize heat transfer. The vertical air flow path adjacent each of the end walls of the cart may be achieved by providing a small longitudinally projecting spacer tab on each tray end, or cooperating detents on the trays and shelves, but it is preferable to provide spacer means on each end wall to prevent the trays from getting within about 0.5 inches of the vertical end wall. If the spacer means takes the form of an insulated blocking pad which fills the space between the ends of the trays and the cart end wall in the region adjacent the hot food-containing portion of the trays, the chilled air will tend to be channeled into a path over the cold items on the trays. Thus, the air circulation around the hot containers will be minimized and the cooling load of the apparatus will be reduced.

BRIEF DESCRIPTION OF THE DRAWINGS

FIG. 1 is a perspective view of a tray cart which has been partially broken away to illustrate the improved chilling apparatus;

FIG. 2 is an exploded perspective view illustrating the various elements of the chilling apparatus;

FIG. 3 is a fragmentary end view of the top portion of the cart with the door removed;

FIG. 4 is a horizontal sectional view through the tray cart above a tray surface so as to illustrate the direction of air flow, the heated food containers having been omitted for clarity; and FIG. 5 is a side sectional view of the top of the cart taken on line 5—5 of FIG. 4 with the dry ice pieces and the heated food containers removed for clarity and arrows added to show the circulation pattern for the chilled air.

DETAILED DESCRIPTION OF THE DRAWINGS

FIG. 1 is a perspective view illustrating the environment in which the invention is used. Although the enclosure or cart 10 is different, the integral heater shelves 12, the food trays 14 and their operative relationship with the cart are substantially identical to the corresponding elements in the aforementioned U.S. Pat. No. 4,346,756. The cart 10 differs in that it has one or more small fans or blowers 16 which draw in air moving vertically upwardly along the inside of the door 18 and blow it over a bed of dry ice pieces 20 which are positioned in a removable pan or bunker 22. The chilled air is then deflected by the deflecting vane 24 along the inside surface 28' of the door 28 which is of course closed during use. The bottom wall of the bunker is preferably flat and unobstructed by vertical obstructions in the region adjacent the deflecting member 24 since the $CO_2$ vapor from the dry ice is heavier than air and will of course flow more freely if there are no obstructions in its path. A vertical pad member 30 on door 28 and a similar pad 32 on door 18 are preferably provided to space the trays 14 from the doors, thus insuring the air and $CO_2$ vapor can circulate vertically along the doors and over the cold food containers 33. The pads 30,32 also serve to prevent vertical air flow adjacent the "hot" sides of the trays 14 and thus reduce the amount of heat lost by convection from the heated containers 34,36 which contact the heater plates 38,38' carried by the heater shelves 12.

The bunker or pan member 22 is shown more clearly in FIG. 2 in a position rotated 180° from its FIG. 1 position. The bunker 22 includes a molded plastic body which has a circular aperture 40 at one end adapted to mate with the blower 16. The blower 16 is covered by insulation 42 and mounted in a support frame 44 which is firmly attached by fasteners (not shown) to the inside walls of the cart. Electrical lead wires (not shown) extend from the blower to the same junction box 48 which provides power to the heater plates. A curved vane member 50 is affixed to the support frame 44 and serves as an inlet duct to direct air to the blower as seen in FIG. 5. The bottom surface of the bunker 22 may have a raised portion on the side thereof which is adapted to overlie the heater shelves 12. The bottom and sides of the bunker are coated with a layer of foam insulation 54 to prevent excessive chilling of the tray 14 which is located directly under the bunker. The aforementioned raised portion of the bunker permits the insulation to be much thicker over the hot side of the tray. To maximize the amount of chilling provided by the bunker 22, the dry ice 20 is preferably broken into pieces and a thin, perforated plastic spacer plate 56 is placed over a bottom layer of dry ice and is itself covered with dry ice. To provide some rigidity to the thin plate 56, one or more strengthening ribs 56' may be provided.

FIG. 3 illustrates the compactness of the bunker 22 which slides into the cart 10 on guide rails 58,60 and, even with additional insulation 62 added to the inside top wall of the cart, takes up no more space than a tray 14. If desired, the cart 10 can be provided with a selectively closable aperture in one door to permit the cart to be connected to a mechanical refrigeration unit when desired. Thus, the same cart could be used in an aircraft with mechanical refrigeration by not placing dry ice in the bunker.

FIGS. 4 and 5 illustrate the flow of chilled air through the cart and across the cold food containers 33. The blower 16 draws warmed air up along the inside of door 18 and forces it across the dry ice (not shown) which is placed on the bottom of the bunker 22 and on the spacer shelf 56. The deflector 24 directs the chilled air downwardly along the inside wall 28' of the cart door 28 from where it passes over the trays to the door 18. The circulation is assisted by the fact that the coldest air will drop and the warmed air will rise.

I claim as my invention:

1. In an apparatus for heating at least one covered container on each of a plurality of vertically stacked trays located on a plurality of shelves in a refrigerated enclosure having a door at at least one end thereof while at least one other container on each tray is chilled, the improvement comprising at least one blower element mounted inside the enclosure adjacent the end thereof which is opposite to said door and also adjacent the top wall surface of the enclosure; a removable insulated pan adapted to contain dry ice or other cooling material positioned on a shelf of said enclosure above the stacked trays, said pan having an inlet opening at one end to receive the exhaust from said blower and an exhaust opening at its other end to direct chilled air which has passed over the cooling material in the pan downwardly over the inside surface of said door; spacing means located in said enclosure and/or on the trays for spacing the trays from at least portions of said door and from at least portions of the enclosure end which is opposite to said door, and prevent them from blocking the vertical flow of chilled air passing along the portions of the inside walls of said door and opposite enclosure ends which are adjacent the portions of the trays containing the containers to be chilled, said flow of chilled air being thereby channeled so as to pass downwardly along the door adjacent the exhaust opening in said pan, horizontally across the containers to be chilled on said vertically stacked trays, and upwardly along the end wall of said enclosure opposite to said door to an inlet duct means for said at least one blower element.

2. The apparatus of claim 1 wherein said insulated pan has an elongated curved deflector portion at its exhaust end which is adapted to collect chilled air being blown horizontally across the cooling material in the pan and direct it downwardly.

3. The apparatus of claim 2 wherein the upper surface of the bottom wall of said pan is substantially free of vertical obstructions in the region of said curved deflector so that the chilled air can flow smoothly therefrom into said deflector.

4. The apparatus of claim 1 wherein the pan is insulated at least on its underneath surface, said insulation being substantially thicker along the portion of the pan which is adapted to overlie the containers to be heated than along the portion which overlies the containers to be chilled.

5. The apparatus of claim 4 wherein the bottom inside wall of the pan is deeper on the portion thereof which overlies the containers to be chilled.

6. The apparatus of claim 1 wherein a perforated shelf is positioned in said pan, said shelf being adapted to overlie a layer of dry ice placed on the bottom wall of the pan and to support an additional layer of dry ice.

* * * * *